United States Patent
Gong et al.

(10) Patent No.: US 8,137,565 B2
(45) Date of Patent: Mar. 20, 2012

(54) NAPHTHENIC ACID REMOVAL AND CONVERSION

(75) Inventors: Xiaoyi Gong, Bartlesville, OK (US); Jianhua Yao, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 12/787,099

(22) Filed: May 25, 2010

(65) Prior Publication Data

US 2010/0300937 A1    Dec. 2, 2010

Related U.S. Application Data

(60) Provisional application No. 61/181,533, filed on May 27, 2009.

(51) Int. Cl.
*B01D 15/04* (2006.01)
*C10G 17/00* (2006.01)

(52) U.S. Cl. ........ 210/693; 210/691; 210/694; 422/212; 422/213; 208/263

(58) Field of Classification Search .................. 210/693, 210/694, 908, 912, 909; 208/263; 422/261, 422/212, 213
See application file for complete search history.

(56) References Cited

U.S. PATENT DOCUMENTS

| | | | |
|---|---|---|---|
| 3,853,744 A * | 12/1974 | Lahn | 208/127 |
| 4,495,056 A * | 1/1985 | Venardos et al. | 208/425 |
| 5,104,545 A | 4/1992 | Means et al. | |
| 5,395,536 A | 3/1995 | Brown et al. | |
| 5,922,206 A * | 7/1999 | Darlington et al. | 210/693 |
| 6,063,266 A * | 5/2000 | Grande et al. | 208/263 |
| 7,575,689 B1 * | 8/2009 | Panjala et al. | 210/694 |
| 7,699,961 B2 * | 4/2010 | Ikeda et al. | 202/154 |
| 7,828,978 B2 * | 11/2010 | Geier et al. | 210/656 |

OTHER PUBLICATIONS

Gaikar V. G.; Maiti D. (Department of Chemical Technology, University of Bombay, Matunga, Bombay-400 019, India) "Adsorptive Recovery of Naphthenic Acids Using Ion-Exchange Resins", Reactive & Functional Polymers Y. 1996, vol. 31, No. 2, pp. 155-164 [bibl. : 19 ref.]. Abstract only.

* cited by examiner

*Primary Examiner* — Nina Bhat
(74) *Attorney, Agent, or Firm* — ConocoPhillips Company

(57) ABSTRACT

Methods and apparatus relate to handling of organic contaminants in aqueous streams. The methods and apparatus enable removing the contaminants, such as naphthenic acids, from the aqueous streams and then converting the contaminants into hydrocarbons. The removing and converting of the organic contaminates results in treated discharge and generation of the hydrocarbons, which add to amount of hydrocarbon recovery.

19 Claims, 2 Drawing Sheets

NAPHTHENIC ACID REMOVAL AND CONVERSION

CROSS-REFERENCE TO RELATED APPLICATIONS

None

STATEMENT REGARDING FEDERALLY SPONSORED RESEARCH OR DEVELOPMENT

None

FIELD OF THE INVENTION

Embodiments of the invention relate to methods and systems for treatment and processing of fluid and naphthenic acid contaminants in the fluid.

BACKGROUND OF THE INVENTION

Water produced with oil from underground formations or generated downstream in processes, such as desalting of the oil, forms waste water streams. The waste water streams can contain organics, such as naphthenic acids, which are soluble enough in the waste water streams to prevent removal with oil-water separation. The naphthenic acids contaminating the waste water streams present environmental concerns with respect to discharging of the waste water streams.

Factors influencing naphthenic acids removal include heightening stringency of governmental regulations on ground discharge, increasing water volume in the oil being produced, and rising levels of naphthenic acids in products as a result of more production from heavy oil. These factors can prevent prior approaches for treatment of the waste water streams from being cost effective. Further, the prior approaches to remove the naphthenic acids from the waster water streams often produce additional byproducts that still present problems for disposal.

Therefore, a need exists for improved methods and systems for handling naphthenic acid contaminants.

SUMMARY OF THE INVENTION

In one embodiment, a method includes filtering organic oxygen-containing molecules from water by contacting the water with a sorbent for the molecules. The method further includes extracting the molecules from the sorbent by contacting the sorbent with a liquid hydrocarbon. In addition, converting of the molecules generates hydrocarbons.

According to one embodiment, a system includes both a naphthenic acid filtering unit containing a sorbent for naphthenic acids and a naphthenic acid conversion unit coupled to receive effluent from the sorbent in fluid communication with a hydrocarbon supply. The filtering unit couples to a waste water supply containing the naphthenic acids removable by contact with the sorbent. The conversion unit contains a catalyst to convert the naphthenic acids in the effluent into hydrocarbons.

A method includes removing naphthenic acids from water by contacting the water with a sorbent for the naphthenic acids thereby providing treated water and naphthenic acid loaded sorbent. The method also includes drying the naphthenic acid loaded sorbent and extracting the naphthenic acids into diesel by contacting the diesel with the naphthenic acid loaded sorbent that is dried. Further, hydrotreating the diesel containing the naphthenic acids converts the naphthenic acids into hydrocarbons that add to constituents of the diesel.

BRIEF DESCRIPTION OF THE DRAWINGS

The invention, together with further advantages thereof, may best be understood by reference to the following description taken in conjunction with the accompanying drawings.

DETAILED DESCRIPTION OF THE INVENTION

Embodiments of the invention relate to handling of organic contaminants in aqueous streams. Systems and methods enable removing the contaminants, such as naphthenic acids, from the aqueous streams and then converting the contaminants into hydrocarbons. The removing and converting of the organic contaminates results in treated discharge and generation of the hydrocarbons, which add to amount of hydrocarbon recovery.

In some embodiments, produced water and/or process water resulting from oil refining operations make up the aqueous streams. While described herein with particular reference to the naphthenic acids, the organic constituents may include the naphthenic acids, ethers, alcohols, aldehydes and/or ketones. The organic contaminants for some embodiments thus include oxygen-containing molecules having a formula defined as $C_nH_{2n-x}O_y$, with n selected from 6 to 46, x selected from −2 to 12 and y selected from 1 and 2; or defined as $C_nH_{2n-x}O_2$, with n selected from 6 to 46 and x=0, 2, 4, 6, 8, 10 or 12.

Figure 1:
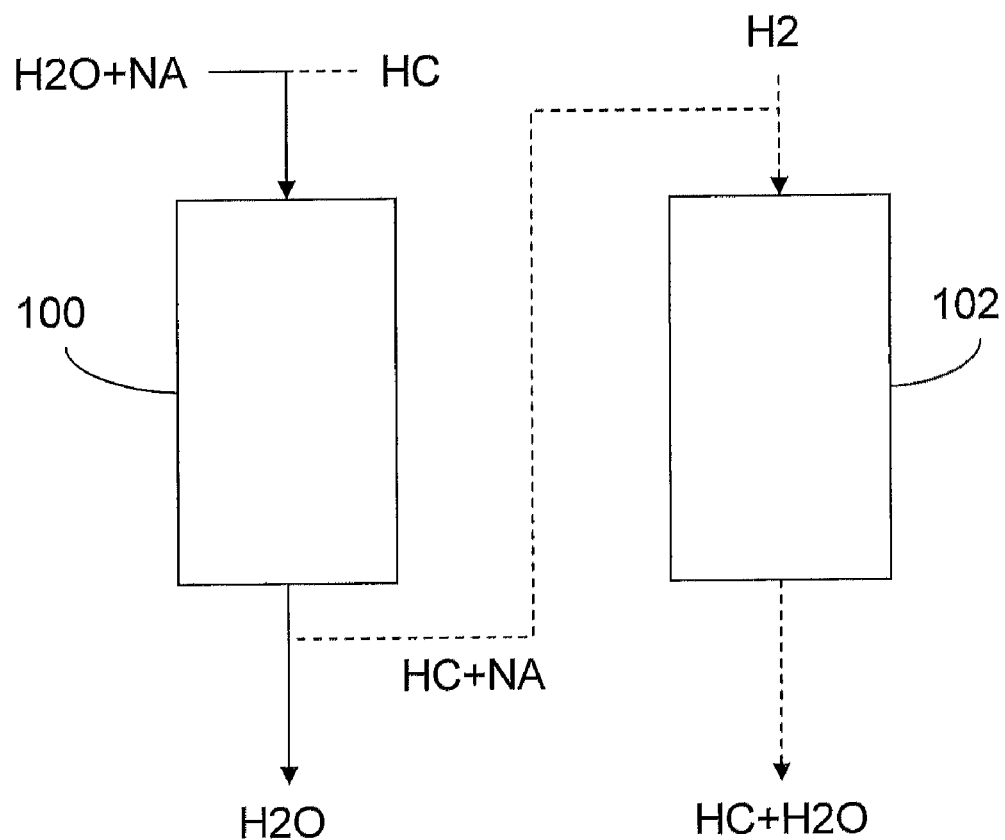
FIG. 1 is a schematic of a treatment and processing system for fluids with naphthenic acid contaminants, according to one embodiment of the invention.

FIG. 1 illustrates a treatment and processing system for fluids with naphthenic acid contaminants. The system includes a filtering unit 100 and a conversion unit 102. In operation, water containing naphthenic acids (H2O+NA) passes through the filtering unit 100 and exits as treated water (H2O), as indicated by solid lines. The water containing the naphthenic acids contacts a sorbent for the naphthenic acids inside the filtering unit 100. Exemplary sorbents include zeolites, carbon, and clays, such as kaolin and/or bentonite, and combinations thereof. The naphthenic acids adsorb onto the sorbent as the water containing the naphthenic acids passes through the filtering unit 100 in which the sorbent is disposed. The treated water thereby contains less of the naphthenic acids and has a lower naphthenic acid concentration than the water containing the naphthenic acids that is input into the filtering unit 100. For some embodiments, the water containing the naphthenic acids contacts the sorbent at a temperature from about 1° C. to about 80° C., from about 20° C. to about 40° C., or from about 23° C. to about 28° C.

In some embodiments, the sorbent includes a zeolite with carbon present on exterior surfaces and pore surfaces of the zeolite. The sorbent fanned of the zeolite may contain at least about 0.05% by weight carbon, at least about 0.07% by weight carbon, or at least about 0.10% by weight carbon. The sorbent may define a surface area between about 40 and about 400 square meters per gram ($m^2/g$) or between about 150 and about 180 $m^2/g$. Further, the sorbent for some embodiments has a micropore volume between about 0.1 cubic centimeters per gram (cc/g) to about 0.5 cc/g and an average particle size between about 20 and about 120 microns. A spent fluid catalytic cracking (FCC) catalyst (or spent FCC catalyst fines) removed from a regenerator section of an FCC unit provides one source for the sorbent formed of the zeolite with carbon. Contacting an FCC catalyst comprising the zeolite with a catalytically crackable hydrocarbon to form a catalytically cracked hydrocarbon product may thus also result in preparation of the sorbent formed of the zeolite with carbon.

Dashed lines indicate a subsequent flow path for achieving extraction and conversion of the naphthenic acids after stopping flow into the filtering unit 100 of the water containing the naphthenic acids. Prior to initiating with operations utilizing the subsequent flow path, drying the sorbent removes remaining water on the sorbent. The sorbent once dried then becomes immersed in a liquid hydrocarbon (HC) introduced into contact with the sorbent to extract the naphthenic acids adsorbed on the sorbent. The drying and extraction may occur at or above the temperatures for the contacting of the sorbent with the water containing the naphthenic acids since increasing the temperature tends to speed up the drying and extraction.

Desorption of the naphthenic acids from the sorbent regenerates the sorbent for reuse to continue removing the naphthenic acids from the water containing the naphthenic acids. Agitation or mixing may facilitate transfer of the naphthenic acids from the sorbent into the liquid hydrocarbon. Amount of time in contact with the liquid hydrocarbon and contact conditions thereby influence level of regeneration.

For some embodiments, the liquid hydrocarbon includes gasoline and/or diesel even though other hydrocarbons can also be used to extract the naphthenic acids based on tendency of the naphthenic acids to be desorbed from the sorbent that is inorganic into the liquid hydrocarbon that is organic like the naphthenic acids. The gasoline and/or diesel contain molecules with from 4 to 21 carbon atoms so that the molecules are small enough to facilitate flow and interaction with all surfaces of the sorbent for removal of the naphthenic acids. If the diesel is used alone, the naphthenic acids removed may possess a molecular weight within a range of the diesel such that the naphthenic acids when converted form hydrocarbons that need not be removed from the diesel but rather are additive to the diesel.

The liquid hydrocarbon thereby passes in contact with the sorbent loaded with the naphthenic acids and is removed from the sorbent as hydrocarbon containing naphthenic acids (HC+NA). The hydrocarbon containing naphthenic acids feed into the conversion unit 102. Exemplary conversion units include deoxygenation based systems, such as hydrotreating reactors or decarboxylating reactors with appropriate catalysts and conditions (e.g., above 200° C. and above 345 kilopascal (kPa)). In some embodiments, materials forming the catalysts include a noble metal catalytic element, which may be in oxide form, dispersed on a support. Examples of the catalyst include cobalt/molybdenum, nickel, cobalt/nickel/molybdenum, or nickel/molybdenum dispersed on the support, such as alumina.

A hydrogen containing feed (H2) enters the conversion unit 102 for reaction with the naphthenic acids during the hydrotreating. Products of the hydrotreating include generated hydrocarbons and water mixed with the liquid hydrocarbon input into the conversion unit 102 such that a hydrocarbon and water mixture (HC+H2O) defines an output from the conversion unit 102. For decarboxylation with the conversion unit 102, the products generated include carbon dioxide instead of water.

Separation of the hydrocarbon and water mixture divides the mixture into a water phase and a hydrocarbon phase. In some embodiments, the hydrocarbon phase provides feed into a refinery for fractionating and further processing. The hydrocarbon phase for some embodiments mixes with other refinery product streams or is used alone as a source of fuel.

Figure 2:
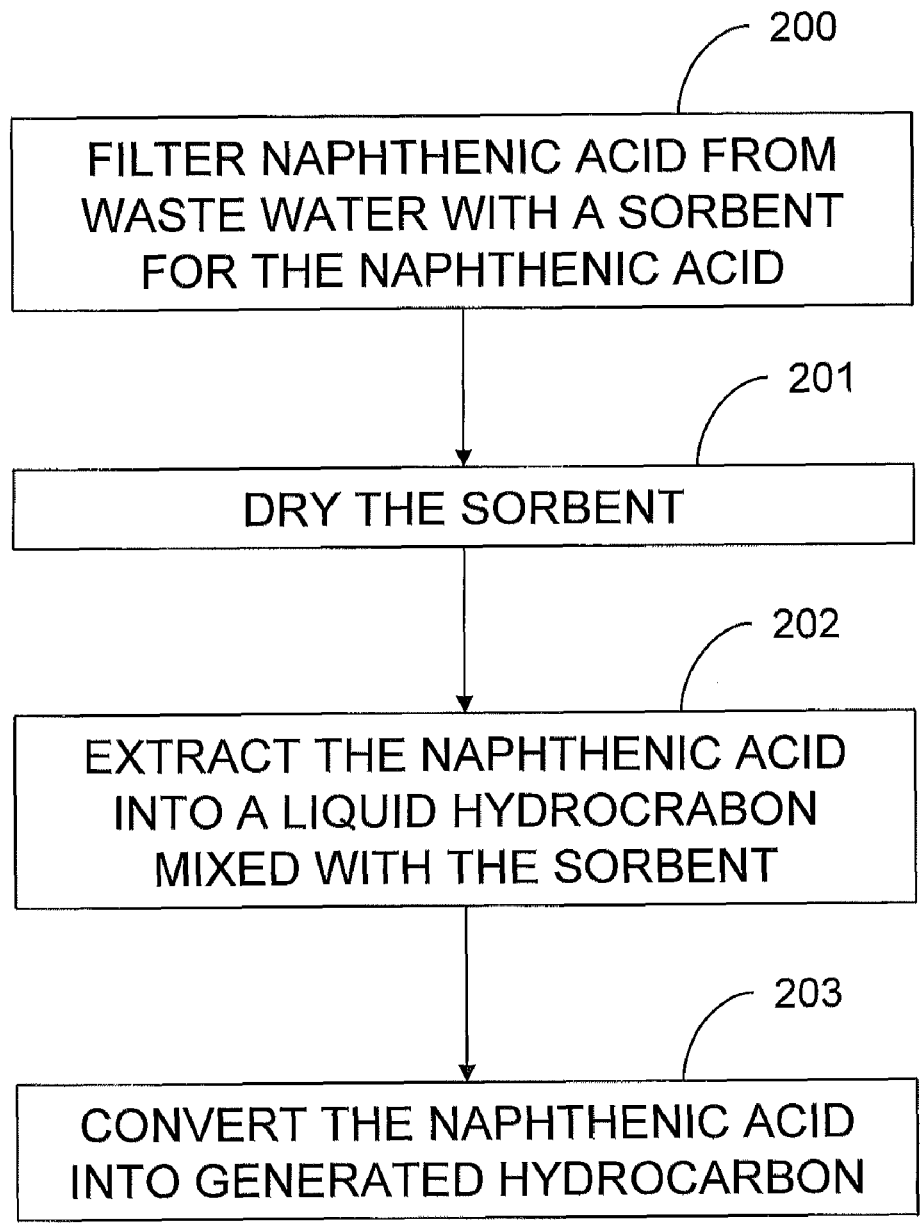
FIG. 2 is a flow chart illustrating a method of removing from waste water naphthenic acids made into additional fuel, according to one embodiment of the invention.

FIG. 2 shows a flow chart illustrating a method of removing from waste water naphthenic acids made into additional fuel. In a water treatment step 200, the method includes filtering the naphthenic acids from waste water utilizing a sorbent for the naphthenic acids. Drying of the sorbent occurs next in a water-to-hydrocarbon transition step 201. Extracting step 202 results in the naphthenic acids loaded onto the sorbent during the water treatment step 200 to be desorbed into a liquid hydrocarbon introduced into contact with the sorbent. After the extracting step 202, utilization of the sorbent switches back for reuse in the water treatment step 200. In a reacting step 203, an effluent of the liquid hydrocarbon that is from the sorbent and contains the naphthenic acids removed in the extracting step 202 enters a conversion unit having catalysts and conditions suitable to convert the naphthenic acids into generated hydrocarbons.

EXAMPLE

A laboratory experiment demonstrated an exemplary full cycle approach for water treatment without byproduct waste. Test water contained 3.5 grams naphthenic acid in 3.5 liters. The test water was passed through a filtration bed at ambient temperature and a flow rate of 14 cubic centimeters per minute (cc/min). The filtration bed was charged with 39.8 grams of FCC spent catalyst formed of a zeolite. The spent catalyst was determined to have retained 2.09 grams of the naphthenic acid.

The spent catalyst was next dried at ambient temperature. Once dried, 300 grams of diesel was added to the spent catalyst and stirred for 5 hours. A total acid number (TAN) of the diesel was then measured to be 0.34 mg KOH/g.

The diesel containing the naphthenic acid was passed through a hydrotreating process using CoMo hydrotreating catalyst. The hydrotreating was carried out at 4137 kPa, 340° C. and an hourly space velocity of 1.0 hr$^{-1}$. Respective flow rates for the diesel and a hydrogen feed for the hydrotreating were 20 cc/hr and 200 cc/min. Product from the hydrotreating was measured to have a TAN of 0.05 mg KOH/g, indicating the naphthenic acid had been converted into hydrocarbon.

The preferred embodiment of the present invention has been disclosed and illustrated. However, the invention is intended to be as broad as defined in the claims below. Those skilled in the art may be able to study the preferred embodiments and identify other ways to practice the invention that are not exactly as described herein. It is the intent of the inventors that variations and equivalents of the invention are within the scope of the claims below and the description, abstract and drawings are not to be used to limit the scope of the invention.

The invention claimed is:

1. A method comprising:
    filtering organic oxygen-containing molecules from water by contacting the water with a sorbent for the molecules, wherein the organic oxygen-containing molecules have a formula defined as $C_nH_{2n-x}O_z$; with n selected from 6 to 46, x selected from −2 to 12 and z selected from 1 and 2,
    wherein the water comprises produced water, process water, or combinations thereof resulting from oil refining operations;
    extracting the molecules from the sorbent by contacting the sorbent with a liquid hydrocarbon; and
    converting the molecules into generated hydrocarbons.

2. The method system according to claim 1, wherein the organic oxygen-containing molecules comprise naphthenic acid.

3. The method system according to claim 1, wherein the organic oxygen-containing molecules include at least one of naphthenic acid, alcohol, ether, aldehyde and ketone.

4. The method system according to claim 1, wherein the liquid hydrocarbon comprises at least one of diesel and gasoline.

5. The method according to claim 1, wherein converting the molecules into the generated hydrocarbons comprises hydrotreating the liquid hydrocarbon containing the molecules that are extracted from the sorbent.

6. The method according to claim 1, wherein converting the molecules into the generated hydrocarbons comprises contacting the liquid hydrocarbon containing the molecules that are extracted from the sorbent with a hydrotreating catalyst containing cobalt and molybdenum.

7. The method according to claim 1, wherein converting the molecules into the generated hydrocarbons comprises decarboxylating the molecules that are contained in the liquid hydrocarbon due to the extracting.

8. The method according to claim 1, wherein the sorbent comprises a zeolite with carbon present on exterior surfaces and pore surfaces of the zeolite.

9. The method system according to claim 1, further comprising drying the sorbent loaded with the molecules from the contacting with the water.

10. A system, comprising:
   a waste water supply containing naphthenic acids;
   a naphthenic acid filtering unit containing a sorbent for naphthenic acids,
      wherein the filtering unit is coupled to the waste water supply containing the naphthenic acids removable by contact with a sorbent;
      wherein the filtering unit is adapted for drying the sorbent and adapted for introducing a liquid hydrocarbon supply to contact the sorbent, thereby producing a liquid hydrocarbon effluent containing naphthenic acids;
   a naphthenic acid conversion unit coupled to receive the liquid hydrocarbon effluent,
      wherein the conversion unit contains a catalyst to convert the naphthenic acids in the effluent into hydrocarbons.

11. The system according to claim 10, wherein the conversion unit is coupled to a hydrogen supply and the catalyst is a hydrotreating material.

12. The system according to claim 10, wherein the catalyst is a hydrotreating material containing cobalt and molybdenum.

13. The system according to claim 10, wherein the catalyst is a material that facilitates decarboxylation of the naphthenic acids in the effluent.

14. The system according to claim 10, wherein the sorbent comprises a zeolite with carbon present on exterior surfaces and pore surfaces of the zeolite.

15. The system according to claim 10, wherein the sorbent comprises a zeolite and the catalyst is a hydrotreating material.

16. A method comprising:
   removing naphthenic acids from water by contacting the water with a sorbent for the naphthenic acids thereby providing treated water and naphthenic acid loaded sorbent;
   drying the naphthenic acid loaded sorbent;
   extracting the naphthenic acids into diesel by contacting the diesel with the naphthenic acid loaded sorbent that is dried; and
   hydrotreating the diesel containing the naphthenic acids to convert the naphthenic acids into hydrocarbons that add to constituents of the diesel.

17. The method according to claim 16, wherein the sorbent comprises a zeolite with carbon present on exterior surfaces and pore surfaces of the zeolite.

18. The method according to claim 16, wherein the sorbent comprises a zeolite with at least 0.05% by weight carbon present on exterior surfaces and pore surfaces of the zeolite.

19. The method according to claim 16, wherein the sorbent comprises a zeolite and the hydrotreating includes contacting the diesel containing the naphthenic acid with a catalyst comprising cobalt and molybdenum.

* * * * *